June 22, 1965

E. REINER 3,190,217

BEARING ARRANGEMENT FOR REMOVABLE
TYPE WHEEL ASSEMBLY

Filed Feb. 5, 1963

Inventor:
Ernst Reiner
By
attorney

United States Patent Office 3,190,217
Patented June 22, 1965

---

3,190,217
BEARING ARRANGEMENT FOR REMOVABLE TYPE WHEEL ASSEMBLY
Ernst Reiner, 15 Baumannstrasse, Furtwangen, Germany
Filed Feb. 5, 1963, Ser. No. 256,474
Claims priority, application Germany, Mar. 12, 1962,
R 23,865/47
3 Claims. (Cl. 101—110)

The present invention relates to an axle bearing arrangement, especially for type wheel printing attachments.

It is usually necessary for an axle to be moved, for the purpose of assembly into or dismantling from a bearing frame, in the axial direction, so that wheels fitting on the axle must be removed on dismantling in order that the axle can be withdrawn from the bearing bores, or during assembly, as the case may be, each member must again be mounted on to the axle after which the axle is introduced into the bores. A bearing arrangement of this kind is of extreme disadvantage, primarily so if several wheels are to be selectively mounted on to one axle or have to be removed therefrom.

It is one object of the present invention to provide an axle bearing arrangement, which avoids the mentioned disadvantage.

It is another object of the present invention to provide an axle bearing arrangement, which comprises a wheel axle, especially for the mounting of a plurality of exchangeable printing type wheels, which wheel axle is capable of being mounted through jaw-like apertures in the bearing frame, to be fixed by means of displaceable bearing bushes fitting on the axle and in the bearing bores of the frame. The bearing bores of the frame parts are now formed open towards one side like a jaw gauge, in which aperture width the wheel axle is capable of being inserted, while bushes slidable on the axle with correspondingly larger external diameter are inserted, so as to be a fit in the bearing bores of the frame parts, so that the axle of smaller diameter is then fixedly installed in the frame.

To dismantle the wheel axle on the other hand the bearing bushes are again slid out of the frame bores so that the axle can then be withdrawn out of the jaw-like aperture of width fitting the axle diameter in the frame. Even for printing mechanism with optional numbers of type wheels the possibility which is now provided of easier mounting is of great advantage since the assembly or dismantling as the case may be, in consequence of the type wheels being dirty and for the purpose of cleansing them or for any desired modification of the number of wheels corresponding to the presently obtaining requirements, must frequently take place.

Figure 1:
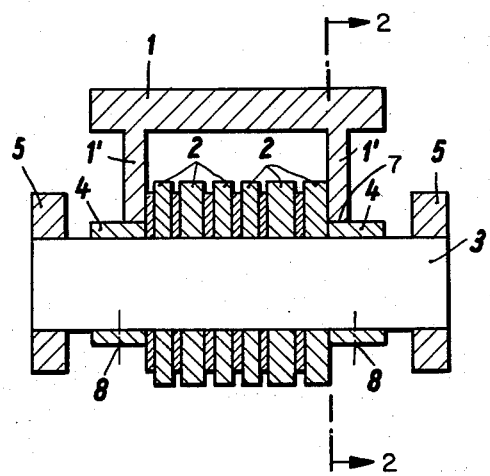
Figure 2:
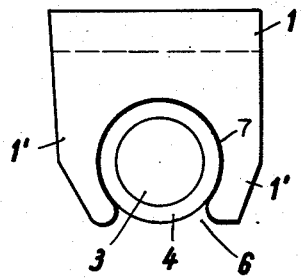

With these and other objects in view, which will become apparent in the following detailed description, the present invention will be clearly understood in connection with the accompanying drawings, in which:

FIGURE 1 is an axial section of the arrangement showing the use of the axle mounting in accordance with the present invention on a printing mechanism; and FIG. 2 is a section along the lines 2—2 of FIG. 1.

Referring now to the drawings, a bearing frame 1 has lateral flanges 1' and receives an axle 3 mounted therein and including a set of wheels 2 which are pushed onto the axle 3. These flanges 1' are provided, in accordance with the present invention, with jaw-like apertures 6 of a width complementary to the diameter of the wheel axle 3, so that the latter is easily capable of being guided into and out of the bearing frame 1 together with the set of wheels 2. Bearing bushes 4 are arranged displaceably on the axle 3 and at the same time are adapted to be pushed as a fit into the bearing bore 7 in the frame part 1, these bearing bushes 4 then retaining the wheel axle 3 in the frame 1. The external diameter of the bearing bush 4 corresponds, therefore to the bearing bores 7 in the flanges 1'. For dismantling the axle 3 it is only necessary to withdraw the bearing bushes 4 in axial direction out of the bores 7 and abutment collars 5 can also be provided as abutment means for the bearing bushes 4, whereupon the axles together with the set of wheels 2 is withdrawable already through the jaw opening 6 which in the embodiment disclosed in FIG. 2 of the drawing is illustrated downwardly. The bearing bushes 4 can be additionally secured in the pushed-in, operative condition by means of grub screws 8.

The invention is especially suitable for use in conjunction with the printing attachment, disclosed in copending patent application, Serial No. 227,452, filed on Oct. 1, 1962.

While I have disclosed one embodiment of the present invention, it is to be understood that this embodiment is given by example only and not in a limiting sense, the scope of the present invention being determined by the objects and the claims.

I claim:
1. In an axle bearing arrangement of a type wheel printing attachment, a frame comprising two parallel mutually spaced flanges, said flanges having aligned bores therethrough, each said bores being circumferentially recessed whereby each said flange is jaw-like in shape, an axle having a diameter less than the width of the flange interruptions, a plurality of printing wheels on said axle between said flanges, each of said wheels being of a larger diameter than that of said bores, and two bushes, each of said bushes being longitudinally slidable on said axle and fitting within the bores of said flanges.

2. The arrangement, as set forth in claim 1, which includes collars disposed on said axle, in order to limit the axial displacement of said bushes thereon.

3. The arrangement, as set forth in claim 1, which includes securing means for retaining said bushes in fitted engagement in the bores of said flanges.

References Cited by the Examiner
UNITED STATES PATENTS

| | | | |
|---|---|---|---|
| 708,295 | 9/02 | Bartusch | 101—85 |
| 1,131,959 | 3/15 | Robbins | 101—110 |
| 1,266,807 | 5/18 | Hubbard | 101—85 |
| 1,891,656 | 12/32 | Stiegler | 101—110 |
| 1,968,900 | 8/34 | Naughler | 101—110 |

WILLIAM B. PENN, *Primary Examiner.*